US012290124B2

(12) United States Patent
Baker et al.

(10) Patent No.: US 12,290,124 B2
(45) **Date of Patent: *May 6, 2025**

(54) LIGHT-EMITTING SYSTEMS FOR HEADGEAR

(71) Applicant: Illumagear, Inc., Seattle, WA (US)

(72) Inventors: John Maxwell Baker, Seattle, WA (US); Andrew Royal, Seattle, WA (US); Raymond Walter Riley, Bainbridge Island, WA (US); Mark John Ramberg, Bellevue, WA (US); Chad Austin Brinckerhoff, Issaquah, WA (US); John R. Murkowski, Seattle, WA (US); Trent Robert Wetherbee, Kennewick, WA (US); Alexander Michael Diener, Federal Way, WA (US); Kristin Marie Will, Seattle, WA (US); Kyle S. Johnston, Sammamish, WA (US); Clint Timothy Schneider, Mercer Island, WA (US); Evan William Mattingly, Seattle, WA (US); Keith W. Kirkwood, Bainbridge Island, WA (US); Jonathan Brandt Hadley, Renton, WA (US)

(73) Assignee: Illumagear, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,533

(22) Filed: Oct. 10, 2023

(65) Prior Publication Data

US 2024/0172830 A1 May 30, 2024

Related U.S. Application Data

(63) Continuation of application No. 17/687,514, filed on Mar. 4, 2022, now Pat. No. 11,857,018, which is a
(Continued)

(51) Int. Cl.
*A42B 3/04* (2006.01)
*F21V 21/084* (2006.01)
*F21V 33/00* (2006.01)

(52) U.S. Cl.
CPC ............ *A42B 3/044* (2013.01); *F21V 21/084* (2013.01); *F21V 33/0076* (2013.01); *F21V 33/0008* (2013.01)

(58) Field of Classification Search
CPC ... A42B 3/044; F21V 21/084; F21V 33/0008; F21V 33/0076
See application file for complete search history.

(56) References Cited

U.S. PATENT DOCUMENTS 3,665,451 A 5/1972 Keith
3,676,664 A 7/1972 Corvetti
(Continued)

FOREIGN PATENT DOCUMENTS

CN 2464105 Y 12/2001
CN 201929089 U 8/2011
(Continued)

OTHER PUBLICATIONS

International Search Report and Written Opinion, mailed May 31, 2013, for International Application No. PCT/US2013/028064, 14 pages.
(Continued)

*Primary Examiner* — Jason M Han
(74) *Attorney, Agent, or Firm* — Seed IP Law Group LLP

(57) ABSTRACT

A light-emitting system is provided which is removably attachable to headgear for personal illumination to enhance visibility of the user to others. The light-emitting system includes a housing that defines a receiving aperture and is configured to surround a portion of the headgear when the light-emitting system is removably attached to the headgear
(Continued)

for use. The light-emitting system further includes at least one lens and a plurality of lighting elements coupled to the annular housing which are configured to selectively generate a halo or at least a partial halo of light that radiates outwardly away from the annular housing through the at least one lens to provide enhanced personal illumination.

10 Claims, 10 Drawing Sheets

Related U.S. Application Data continuation of application No. 16/993,107, filed on Aug. 13, 2020, now Pat. No. 11,291,260, which is a continuation of application No. 16/893,269, filed on Jun. 4, 2020, now Pat. No. 10,779,598, which is a continuation of application No. 16/731,828, filed on Dec. 31, 2019, now Pat. No. 10,709,189, which is a continuation of application No. 16/254,319, filed on Jan. 22, 2019, now Pat. No. 10,561,188, which is a continuation of application No. 15/970,588, filed on May 3, 2018, now abandoned, which is a continuation of application No. 15/653,353, filed on Jul. 18, 2017, now Pat. No. 9,986,778, which is a continuation of application No. 14/794,615, filed on Jul. 8, 2015, now Pat. No. 9,737,105, which is a continuation of application No. 13/972,627, filed on Aug. 21, 2013, now Pat. No. 9,103,539, which is a continuation of application No. 13/779,634, filed on Feb. 27, 2013, now Pat. No. 8,529,082.

(60) Provisional application No. 61/604,982, filed on Feb. 29, 2012.

(56) References Cited

U.S. PATENT DOCUMENTS

| | | | |
|---|---|---|---|
| D250,496 | S | 12/1978 | Odell et al. |
| D298,476 | S | 11/1988 | Lönnstedt |
| D300,868 | S | 4/1989 | Conforti |
| 4,862,331 | A | 8/1989 | Hanabusa |
| 4,970,631 | A | 11/1990 | Marshall |
| D318,338 | S | 7/1991 | Mitchell |
| 5,408,393 | A | 4/1995 | Becker |
| 5,469,342 | A | 11/1995 | Chien |
| 5,559,680 | A | 9/1996 | Tabanera |
| D375,612 | S | 11/1996 | Elder |
| 5,667,292 | A | 9/1997 | Sabalvaro, Jr. |
| 5,758,947 | A | 6/1998 | Glatt |
| 5,810,467 | A | 9/1998 | Hurwitz |
| 5,836,673 | A | 11/1998 | Lo |
| D403,841 | S | 1/1999 | Drone |
| D412,761 | S | 8/1999 | Oki et al. |
| D424,239 | S | 5/2000 | Key |
| 6,082,867 | A | 7/2000 | Chien |
| D435,699 | S | 12/2000 | Mowry |
| D441,886 | S | 5/2001 | Beck |
| 6,244,721 | B1 | 6/2001 | Rodriguez et al. |
| 6,619,831 | B2 | 9/2003 | Kanesaka |
| D500,178 | S | 12/2004 | Fournier et al. |
| 6,877,875 | B2 | 4/2005 | Yu et al. |
| 6,982,633 | B2 | 1/2006 | Burdick |
| D529,214 | S | 9/2006 | Sherring |
| 7,121,676 | B1 | 10/2006 | Kutnyak |
| 7,210,810 | B1 | 5/2007 | Iversen et al. |
| 7,304,442 | B2 | 12/2007 | Colwell |
| 7,311,413 | B1 | 12/2007 | Barnes |
| D571,942 | S | 6/2008 | Christianson |
| D583,971 | S | 12/2008 | Castellucci et al. |
| D584,010 | S | 12/2008 | Fernandes et al. |
| 7,465,078 | B2 | 12/2008 | Chang |
| D590,530 | S | 4/2009 | Tsai |
| 7,620,279 | B2 | 11/2009 | Joseph |
| D612,544 | S | 3/2010 | Brace et al. |
| 7,690,806 | B2 | 4/2010 | Feinbloom et al. |
| 7,695,156 | B2 | 4/2010 | Hurwitz |
| 8,015,626 | B2 | 9/2011 | Grassl et al. |
| 8,025,432 | B2 | 9/2011 | Wainright |
| 8,070,307 | B2 | 12/2011 | Ho |
| 8,083,365 | B2 | 12/2011 | Cohen et al. |
| 8,113,677 | B2 | 2/2012 | Carpenter |
| 8,117,676 | B1 | 2/2012 | Cardoso |
| 8,157,402 | B2 | 4/2012 | Huss et al. |
| 8,269,619 | B2 | 9/2012 | Lee |
| 2003/0067769 | A1 | 4/2003 | Gilpin |
| 2007/0025100 | A1 | 2/2007 | Caruana |
| 2008/0310144 | A1 | 12/2008 | Wu |
| 2009/0070967 | A1 | 3/2009 | Gonzalez |
| 2009/0073679 | A1 | 3/2009 | Wainright |
| 2010/0128468 | A1 | 5/2010 | Ong et al. |
| 2010/0238682 | A1 | 9/2010 | Carpenter |
| 2010/0277096 | A1 | 11/2010 | Kim |
| 2012/0224356 | A1 | 9/2012 | Fischer et al. |
| 2014/0063790 | A1 | 3/2014 | Gold |

FOREIGN PATENT DOCUMENTS

| | | | |
|---|---|---|---|
| CN | 201973456 | U | 9/2011 |
| JP | 2009-13538 | A | 1/2009 |
| WO | 2012/006653 | A1 | 1/2012 |

OTHER PUBLICATIONS

Kickstarter, "Torch-bicycle helmet with integrated lights," posted as early as May 29, 2011, URL=http://www.kickstarter.com/projects/1652790707/torch-bicycle-helmet-with-integrated-lights, download date Jun. 27, 2013,10 pages.

YouTube Video, "Bicygnals.mov," uploaded on May 19, 2011, URL=http://www.youtube.com/watch?v=SwdCvPPOONM, download date Jun. 27, 2013, 1 page. (Screenshot).

LIGHT-EMITTING SYSTEMS FOR HEADGEAR

BACKGROUND

Technical Field

This disclosure generally relates to light-emitting systems and devices to illuminate people at risk to enhance their visibility to others, such as, for example, systems and devices to illuminate workers in construction, mining, and emergency response fields such that they are particularly noticeable.

Description of the Related Art

Various light-emitting systems and devices are used in construction, mining, and emergency response fields, among others, to illuminate a work area or otherwise provide a source of light to complete tasks under low or poor lighting conditions. For example, industrial floodlight towers are often used in the construction industry to illuminate a work environment. In addition, headlamps of various configurations are often worn by construction workers to provide a source of light to facilitate certain tasks. Such devices, however, suffer from a variety of drawbacks. For example, light emitted from floodlight towers is often blocked by various objects causing regions of darkness where enhanced lighting may be desired. As another example, conventional headlamps often provide a focused beam of light that provides inadequate lighting in areas beyond a user's immediate field of view.

In addition, various personal protective gear exists for enhancing user safety, such as, for example, reflective vests that are intended to increase visibility of the wearer. Such reflective gear, however, also suffers from a variety of drawbacks. For example, it provides a passive system relying on external sources of light to illuminate reflective portions thereof and provides only limited personal illumination in terms of intensity and scope.

BRIEF SUMMARY

Embodiments described herein provide light-emitting systems for headgear that are particularly well adapted to illuminate people at risk, such as, for example, workers in the construction industry, mining industry and other hazardous or hostile environments. The light-emitting systems provide enhanced illumination around the user to enable the completion of tasks that may otherwise be difficult to carry out under low or poor lighting conditions. In some embodiments, the light-emitting systems provide a continuous or substantially continuous ring or halo of light around a user's head that can be seen from an extended distance (e.g., up to and exceeding a one-quarter mile) and from a particularly wide range of directions, such as, for example, from an overhead direction. The light-emitting systems may also simultaneously provide substantial illumination within and outside the user's immediate field of view to illuminate areas within the user's general workspace, including areas in the user's peripheral view, as well as work areas of nearby co-workers.

In one embodiment, a light-emitting system removably attachable to headgear for personal illumination to enhance visibility of the user to others may be summarized as including: an annular housing that defines a receiving aperture and that is configured to surround a portion of the headgear when the light-emitting system is removably attached to the headgear for use; at least one lens coupled to the annular housing; and a plurality of lighting elements coupled to the annular housing which are configured to selectively generate a halo of light that radiates outwardly away from the annular housing through the at least one lens. The plurality of lighting elements may be configured relative to each other and to the at least one lens such that the halo of light continuously surrounds a vertical axis defined by the annular housing and is substantially uniformly diffused when the plurality of lighting elements are activated. The plurality of lighting elements may also be configured relative to each other and to the at least one lens such that the halo of light radiates from the light-emitting system with a vertical spread angle of at least thirty degrees, or in some instances, between about forty-five degrees and about one-hundred and eighty degrees. The plurality of lighting elements may be substantially uniformly spaced along a continuous annular path within the housing or may be spaced irregularly or grouped in distinct clusters.

The light-emitting system may further include an electrical connector coupled to the annular housing and electrically coupled to the plurality of lighting elements; a cable; and an electrical power source selectively attachable to the electrical connector via the cable to provide energy to illuminate the plurality of lighting elements from a power source remote from the annular housing, such as, for example, a power source worn at waist level. Alternatively, the light-emitting system may include an electrical power source coupled to the annular housing to move therewith and electrically coupled to the plurality of lighting elements to provide energy to illuminate the plurality of lighting elements from a location within or adjacent to the annular housing, such as, for example, an onboard rechargeable battery or battery cartridge.

The light-emitting system may further include an attachment mechanism configured to removably secure the annular housing to the headgear. The attachment mechanism may include, for example, an adjustable band that is configured to selectively constrict around the headgear. The attachment mechanism may further include a plurality of engagement devices spaced around an inner periphery of the annular housing to engage the headgear upon installation. At least one of the plurality of engagement devices may be repositionable along a portion of the inner periphery of the annular housing. Additionally, at least one of the plurality of engagement devices may be configured to flex inwardly into engagement with the headgear when the adjustable band is constricted around the headgear. As another example, the attachment mechanism may include a plurality of spacers each having a predetermined width to span a respective space between the annular housing of the light-emitting system and the headgear when the light-emitting system is removably attached to the headgear for use. As yet another example, the attachment mechanism may include a flexible band that extends across the receiving aperture and that is configured to flex outwardly to receive the headgear when the light-emitting system is removably attached to the headgear for use. As still yet another example, the attachment mechanism may include a plurality of cam devices, wherein each cam device is positioned to contact a respective portion of the headgear and rotate into secure engagement therewith as the light-emitting system is removably attached to the headgear for use. Irrespective of particular form, the attachment mechanism may be configured to secure the annular housing to the headgear without compromising the integrity of or penetrating an exterior surface thereof.

In some instances, the annular housing of the light-emitting system is configured such that the annular housing is radially offset from the headgear when the light-emitting system is removably attached to the headgear for use. The annular housing may be radially offset from the headgear by a gap having a generally uniform or a variable width.

The light-emitting system may further include a least one control element coupled to the annular housing to selectively activate the plurality of lighting elements and/or to selectively adjust an intensity of the plurality of lighting elements. The plurality of lighting elements may form a primary set of lighting elements, and the system may further include an auxiliary set of lighting elements coupled to the annular housing distinct from the primary set of lighting elements. The auxiliary set of lighting elements may be configured to selectively illuminate independent of the primary set of lighting elements. For example, an auxiliary set of lighting elements may be provided to produce a higher intensity light source within the immediate field of view of a user and to supplement a continuous or generally continuous ring of light emitted by the primary set of lighting elements. In some instances, a subset of the plurality of lighting elements of the light-emitting system may be configured to selectively illuminate at a different frequency or with a different intensity relative to the other lighting elements. This may provide a strobe effect or other perceivable event to signal different conditions, such as, for example, an emergency or particularly hazardous situation. A visual warning or emergency signal may be selectively activated by the user to alert others of potential danger or to summon assistance.

According to another embodiment, a light-emitting system attachable to headgear for personal illumination to enhance visibility of the user to others may be summarized as including: a rigid annular housing configured to at least partially surround and be radially offset from a portion of the headgear when the light-emitting system is attached to the headwear for use; at least one lens coupled to the rigid annular housing; and a plurality of lighting elements coupled to the annular housing and being configured to selectively generate light through the at least one lens that radiates outwardly away from the rigid annular housing and that sweeps through an azimuth angle of at least 270 degrees. The light-emitting system may further include an attachment mechanism provided at an inner periphery of the rigid annular housing that is configured to removably secure the annular housing to the headgear.

According to yet another embodiment, a light-emitting system attachable to headgear for personal illumination to enhance visibility of the user to others may be summarized as including: a rigid housing that is configured to at least substantially encircle a portion of the headgear when the light-emitting system is attached to the headgear for use; an attachment mechanism provided at an inner periphery of the rigid housing that is configured to removably secure the rigid housing to the headgear; at least one lens coupled to the rigid housing; and a plurality of lighting elements coupled to the rigid housing and being configured to selectively generate light through the at least one lens that radiates outwardly away from the rigid housing. The rigid housing may include a closed annular profile and the plurality of lighting elements may be configured relative to each other and to the at least one lens to generate a halo of light that continuously surrounds a vertical axis defined by the rigid housing.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known structures and devices associated with light-emitting systems may not be shown or described in detail to avoid unnecessarily obscuring descriptions of the embodiments.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its sense including “and/or” unless the content clearly dictates otherwise.

Embodiments described herein provide light-emitting systems for headgear that are particularly well adapted to illuminate people at risk, such as, for example, workers in the construction industry, mining industry or other hazardous or hostile environments. The light-emitting systems provide enhanced illumination around the user to enable the completion of tasks that would otherwise be hindered by low or poor lighting conditions. In some embodiments, the light-emitting systems provide a continuous or generally continuous ring or halo of light around a user's head that can be seen from an extended distance (e.g., up to and exceeding one-quarter mile) and from a particularly wide range of directions, such as, for example, from an overhead direction. The light-emitting systems may also provide substantial illumination within and outside the user's immediate field of view to illuminate areas within the user's general workspace.

Figure 1:
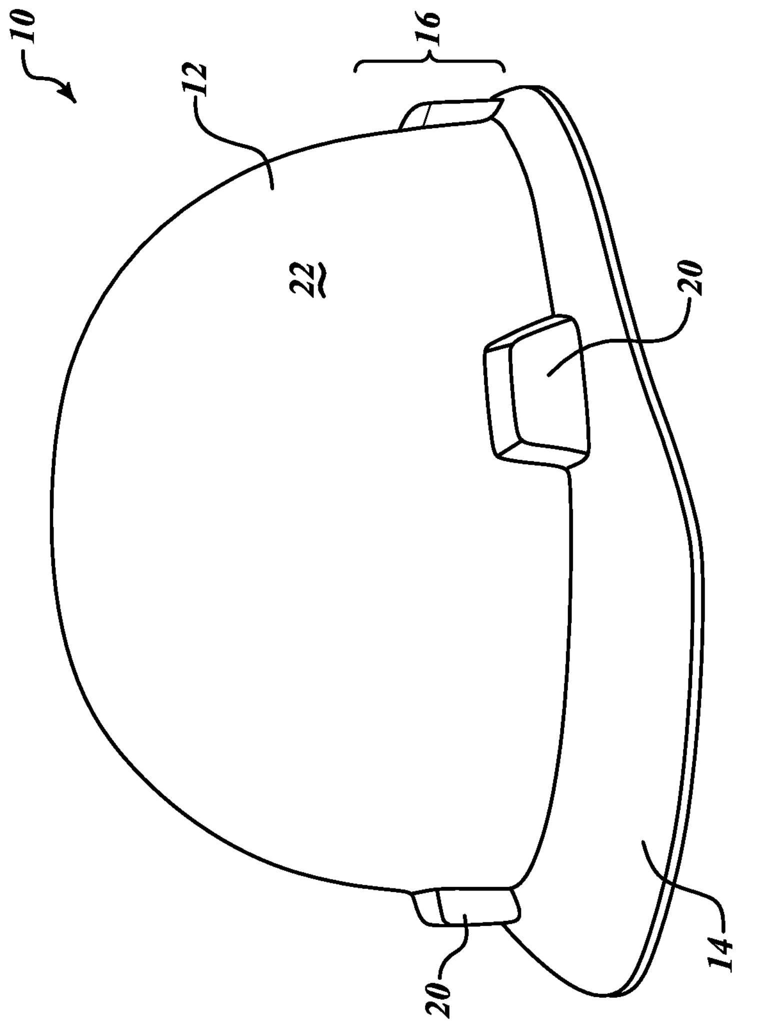
FIG.1 (Prior Art)
FIG. 1 is a perspective view of a conventional hard hat that is typical of those worn by workers in the construction industry, which is provided as a non-limiting example of the types of headgear that may be used in connection with disclosed embodiments of the light-emitting systems described herein.

The light-emitting systems described herein may be advantageously attachable to headgear, such as, for example, the conventional hard hat 10 shown in FIG. 1, in a removable manner. A hard hat 10 is a type of helmet that is often used in the construction industry to protect the wearer's head from falling objects or other impacts. Hard hats 10 are typically rigid structures having a crown portion 12 that defines a head receiving cavity and a brim 14 extending from a lower peripheral portion 16 thereof. Various projections, ridges and/or other structures 20 may be formed in the hard hat 10 to provide additional rigidity or other functionality. Often, for example, projections or other structures 20 are provided in the lower peripheral portion 16 of the hard hat 10 proximate the interface of the crown portion 12 with the brim 14 corresponding to regions where internal straps attach to the hardhat 10. An example hard hat 10 having such projections 20 is the V-Gard® brand helmet available from Mine Safety Appliances Company of Pennsylvania. The exterior surface 22 of the crown portion 12 of a conventional hard hat 10 is generally defined by a convex, dome-like, rigid shell structure. Hard hats 10 may be subject to various testing standards and certification requirements for use on a jobsite, such as those established by regulatory institutions, such as ANSI. Compromising the integrity of such hard hats 10 may therefore jeopardize the ability to utilize them on a jobsite or may require additional testing and certification before such use is feasible.

Although the light-emitting systems described herein are shown and described in the context of attaching to headgear in the form of a conventional hard hat 10 (FIGS. 1 and 3), it will be appreciated by those of ordinary skill in the relevant art that the light-emitting systems and aspects thereof may applied to a wide variety of headgear, including, for example, protective helmets for sports such as bicycling, skiing and football, hats or other headgear. Other examples include, without limitation, firefighter helmets, miner helmets, logging helmets, welder and foundry worker helmets, military helmets and other protective helmets or headgear. In addition, it will also be appreciated that the light-emitting systems and aspects thereof may be used apart from headgear altogether, such as, for example to illuminate inanimate objects. In other instances, the light-emitting systems or aspects thereof may be incorporated or integrated into headgear, rather than being removably attachable thereto. For example, an annular visor incorporating aspects of the light-emitting systems described herein may be provided for placement directly on a user's head for applications in which impact protection may be less of a concern.

Figure 2:
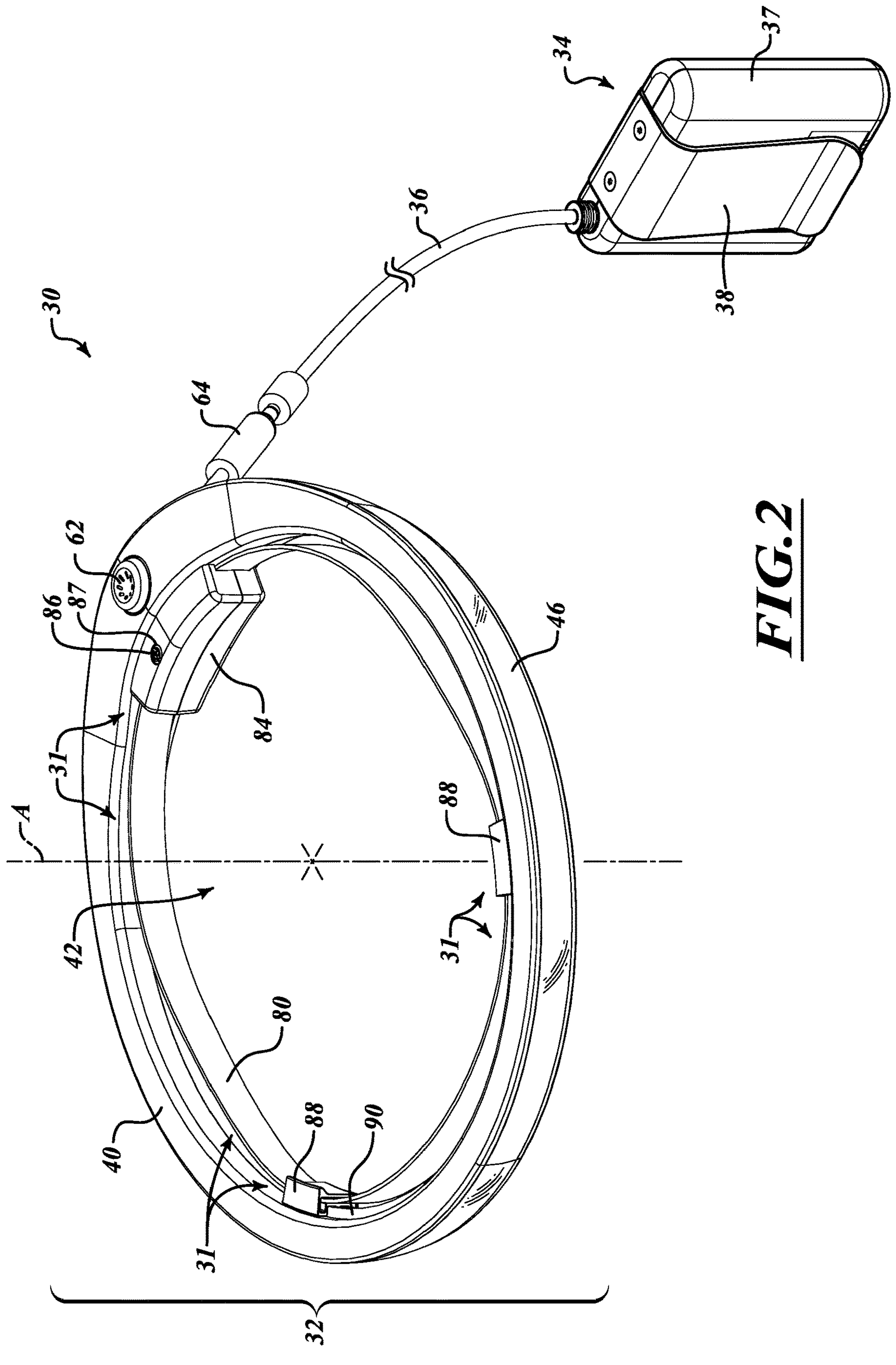
FIG. 2 is a perspective view of a light-emitting system, according to one embodiment, that is readily attachable to headgear, such as, for example, the conventional hard hat shown in FIG. 1.
Figure 3:
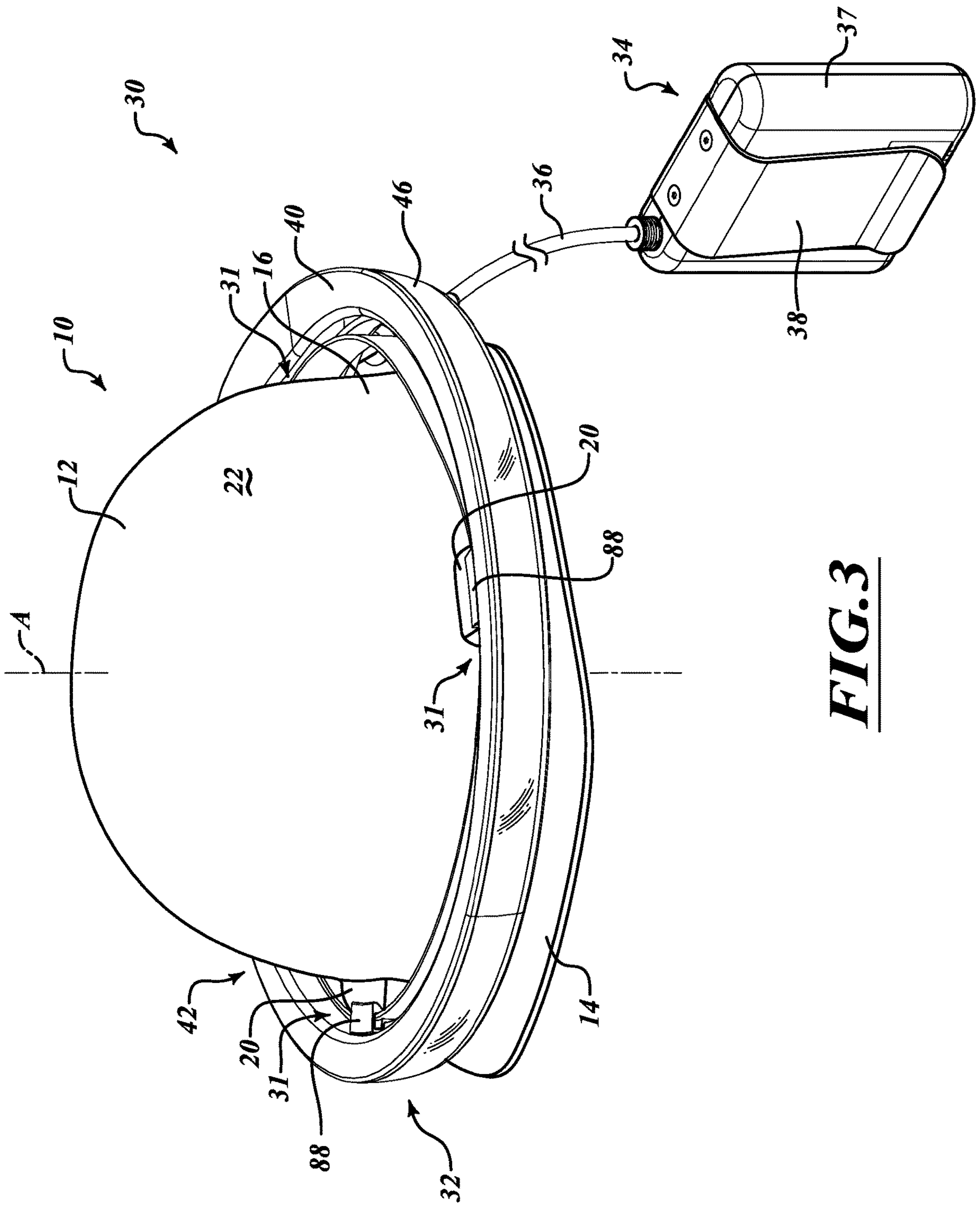
FIG. 3 is a perspective view of the light-emitting system of FIG. 2 attached to headgear in the form of a conventional hard hat.

FIGS. 2 through 6 show an example embodiment of a particularly advantageous light-emitting system 30 that is readily attachable to a conventional hard hat 10 in a removable manner. FIG. 2 shows the light-emitting system 30 apart from a hard hat 10, while FIG. 3 shows the light-emitting system 30 installed on the hard hat 10 for use. More particularly, the light-emitting system 30 shown in FIG. 3 is attached to the lower peripheral portion 16 of the hard hat 10 with an attachment mechanism 31 thereof engaging the hard hat 10 in a manner that facilitates attachment and removal of the light-emitting system 30 without compromising the integrity of the exterior surface 22 of the hard hat 10. Further details of the attachment mechanism 31 and variations thereof are described in further detail elsewhere.

With reference to FIGS. 2 and 3, the light-emitting system 30 includes a light-emitting unit 32 having a generally annular form and a power supply unit 34 that may be electrically coupled to the light-emitting unit 32 by a cable 36 to provide power to the light-emitting unit 32 from a remote location. The power supply unit 34 may comprise, for example, a rechargeable battery pack 37 that may be carried by a user. A clip 38 or other attachment device may be provided on the power supply unit 34 to facilitate attachment to the user, such as, for example, attachment to a belt, pocket or other structure of the user's attire. Advantageously, the power supply unit 34 may have sufficient capacity to provide adequate power to enable continuous illumination of the light-emitting unit 32 at full intensity over an entire work shift, such as, for example, a ten-hour or twelve-hour supply of power. The power supply unit 34 may be connected to the light-emitting unit 32 with a cable 36 that includes a quick disconnect feature that is configured to detach in the event the cable 36 is snagged or becomes caught on an object during use of the light-emitting system 30.

Although the example embodiment shown in FIGS. 2 through 6 includes a remote power supply unit 34, it is appreciated that in some embodiments the light-emitting unit 32 may be provided with an onboard power supply, such as, for example, a rechargeable battery unit or cartridge that is integrated into the light-emitting unit 32 or that is removably attachable thereto. Structures and features of such onboard power supplies are not shown or described in further detail, however, to avoid unnecessarily obscuring descriptions of the embodiments.

With reference again to FIGS. 2 and 3, the light-emitting unit 32 includes an annular housing 40 that defines a receiving aperture 42 sized and shaped to receive the crown portion 12 of a conventional hard hat 10. When attached for use, the annular housing 40 of the light-emitting unit 32 surrounds the lower peripheral portion 16 of the hard hat 10. The annular housing 40 may be configured to completely surround the lower peripheral portion of the hard hat 10. In such cases, the housing 40 may be described as sweeping along a closed path that encircles a central vertical axis A. In some embodiments, the path may be generally elliptical and may reflect a general outer profile of the exterior 22 of the hard hat 10 to which the light-emitting unit 10 is to be attached.

Figure 4:
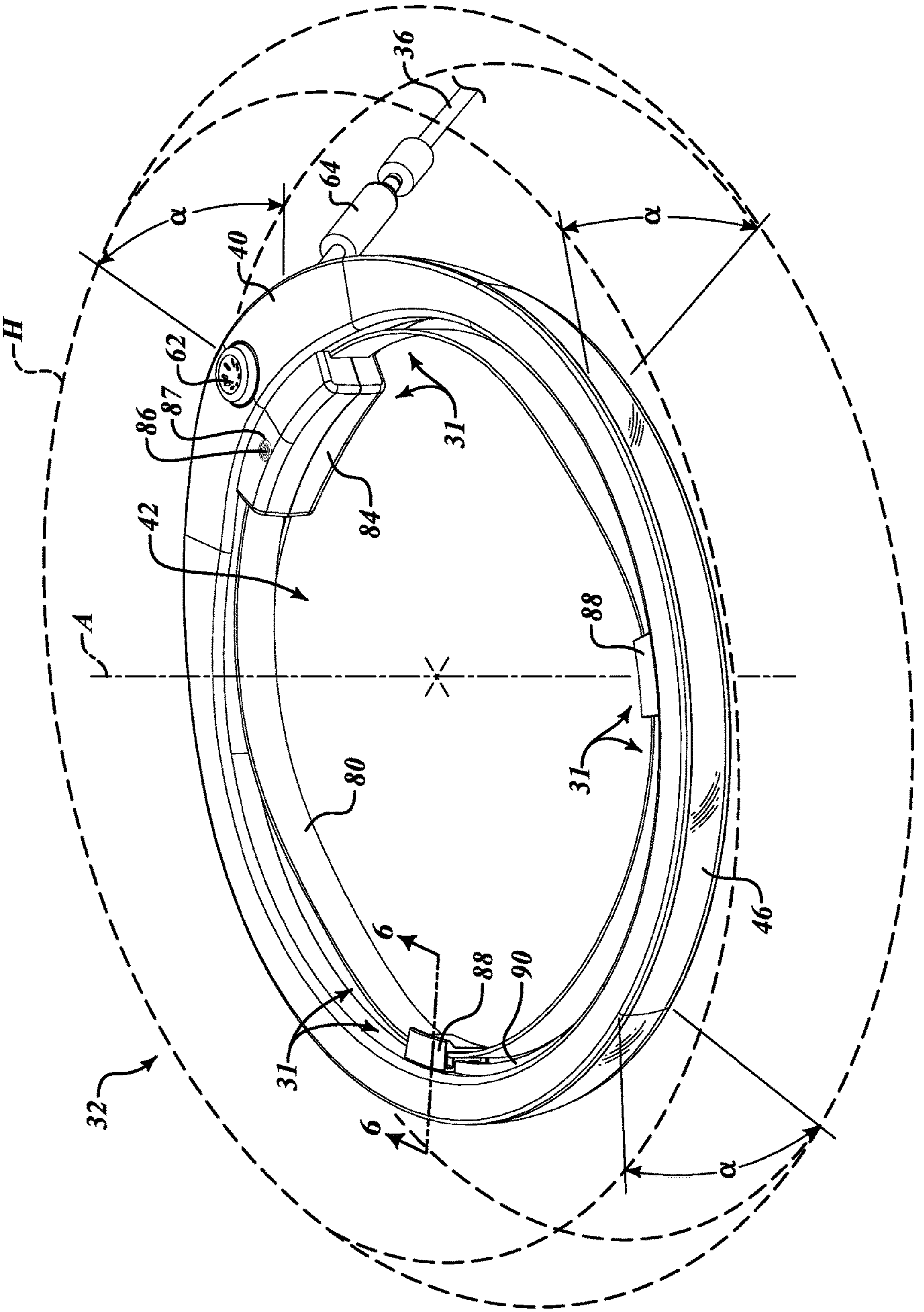
FIG. 4 is a perspective view of a portion of the light-emitting system of FIG. 2 depicting a halo of light radiating outwardly therefrom.
Figure 6:
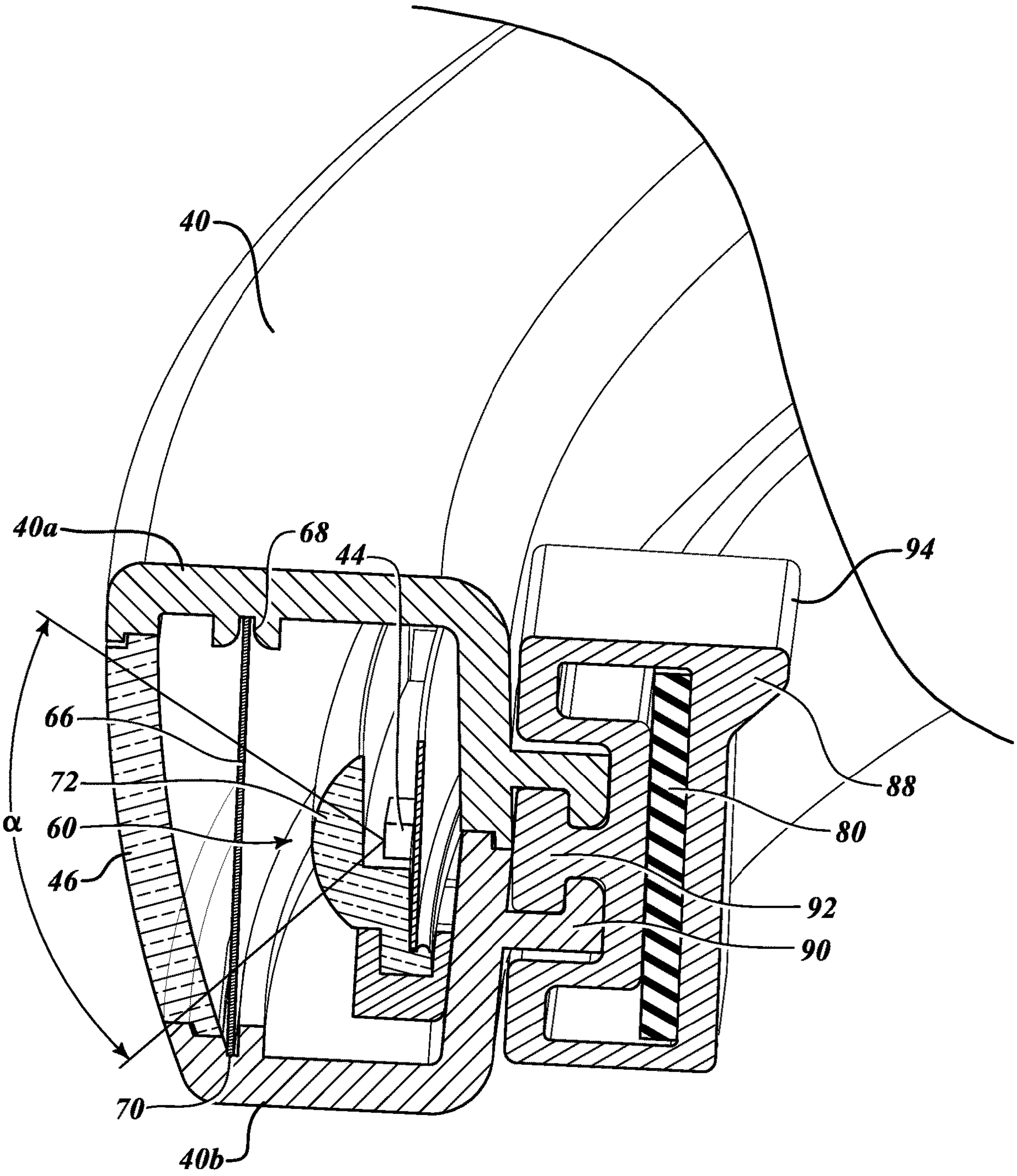
FIG. 6 is a partial cross-sectional view of the portion of the light-emitting system of FIG. 4 taken along line 6-6.

With reference to FIGS. 4 and 6, the light-emitting unit 32 further includes a plurality of lighting elements 44 and at least one lens 46 coupled to the annular housing 40. The lens 46 may be transparent or semi-transparent and may take the form of a window element having generally flat opposing surfaces. In other instances, one or more of the opposing surfaces may be curved to focus or disperse light passing therethrough. The lens 46 may be sandwiched or otherwise positioned between upper and lower portions 40*a*, 40*b* of the housing 40. The lens may comprise a majority of a sidewall area of the light-emitting unit 32 facing outwardly away from the central vertical axis A. The lighting elements 44 are retained within the housing 40 and are configured to selectively generate a ring or halo of light H that radiates outwardly away from the annular housing 40 through the at least one lens 46 when activated, as illustrated in FIG. 4. In some instances, the lighting elements 44 may be configured relative to each other and to the at least one lens 46 such that the ring or halo of light H continuously surrounds the vertical axis A defined by the annular housing 40. In addition, the ring or halo of light H may be substantially uniformly diffused by one or more diffusion lenses when the plurality of lighting elements 44 are activated. The ring or halo of light H being substantially uniformly diffused means that there is little or no perceivable variation in intensity of the light emanating from the light-emitting unit 32. This may provide a ring of light or "halo" that is particularly conspicuous or eye-catching, thereby enhancing personal illumination and user safety.

Figure 5:
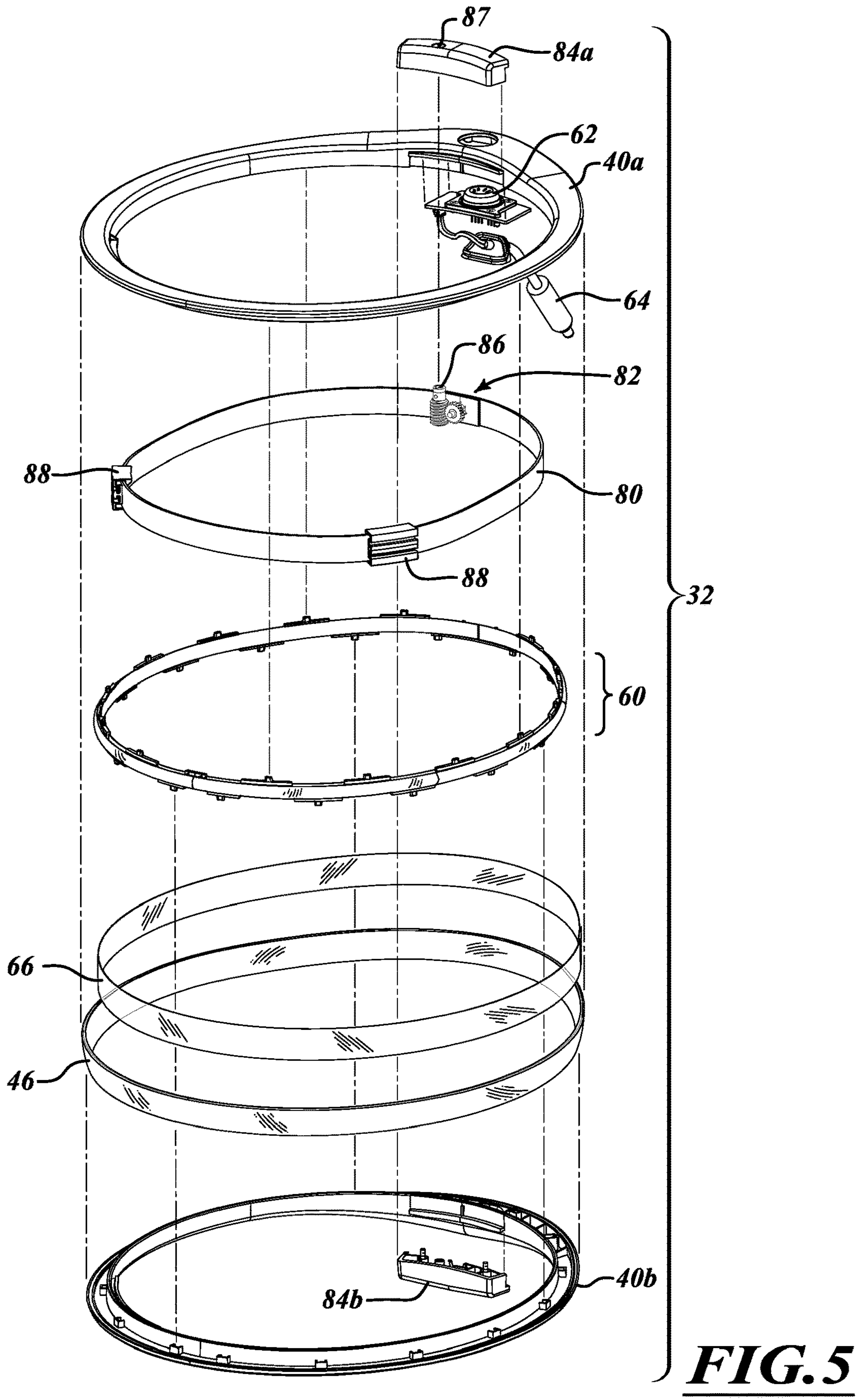
FIG. 5 is an exploded view of the portion of the light-emitting system of FIG. 4.

With reference to FIGS. 5 and 6, the light-emitting unit 32 may include a light-emitting assembly 60 (inclusive of the lighting elements 44) that is electrically coupled to at least one control element 62 and to an electrical connector 64 that may interface with the power supply unit 34 to provide power to the light-emitting assembly 60. The control element 62 may include an on/off switch, button or other control device for activating the lighting elements 44 of the light-emitting assembly 60. In some embodiments, the control element 62 may also include functionality for adjusting an intensity of the light emanating from the light-emitting assembly 60. For example, control element 62 may include a rotary element that adjusts the intensity of the lighting elements 44 in response to rotation thereof.

Although the example embodiment of shown in FIGS. 2 through 6 includes a single control element 62, it is appreciated that a plurality of control elements may be provided for enabling a wide variety of functionalities, such as two or more separate control elements. Functionalities may include producing alternating regions of illumination; activating a visual warning sequence; manipulating a color of the emitted light; and adjusting the intensity of select portions of the lighting elements apart from others. In some instances, some functionality may be adjusted automatically or otherwise independent of user input. For example, an intensity of the emitted light may be automatically adjusted in response to a light sensor or other sensor coupled to the housing that senses a level of brightness within the surrounding environment and adjusts the intensity accordingly (i.e., intensity lowers or dims in brighter environments, and vice versa).

With reference again to FIGS. 5 and 6, the light-emitting unit 32 may further include a diffuser film 66. The diffuser film 66 may be positioned between the lighting elements 44 and the lens 46 to diffuse light emanating from the lighting elements 44 before passing through the lens 46 and radiating outwardly from the housing 40. The diffuser film 66 may be a thin, ribbon-like structure that is held within an interior cavity of the housing 40 by retaining features 68, 70 formed in upper and lower portions 40*a*, 40*b* of the housing 40.

With reference again to FIGS. 5 and 6, the light-emitting assembly 60 may include an interior lens 72 positioned next to the lighting elements 44 to disperse light emanating from the lighting elements 44 before it passes through the outer lens or window 46 to radiate from the housing 40. In some embodiments, the combination of the interior lens 72, the diffuser film 66 and the outer lens 46 may substantially diffuse light emanating from each of separate lighting elements 44 arranged within the generally annular profile of the housing 40. In some embodiments, the lighting elements may comprise LEDs spaced uniformly around a continuous annular path within the housing 40. In other instances, the lighting elements 44 may include irregularly spaced LEDs or LEDs that are grouped in clusters to provide areas with different lighting capabilities, such as, for example, areas that may illuminate with relatively greater intensity than other areas. In other instances, the lighting elements 44 may comprise sources of light other than LEDs.

With reference to FIGS. 4 and 6, the plurality of lighting elements 44 may be configured relative to each other and to the outer lens 46 such that the ring or halo of light H radiates from the light-emitting unit 32 with a vertical spread angle α. In some embodiments, the plurality of lighting elements 44 may be configured relative to each other and to the at least one lens 46 such that the ring or halo of light H radiates from the light-emitting unit 32 with a vertical spread angle α of at least 30 degrees, and in other embodiments with a vertical spread angle α between about forty-five degrees and about one-hundred and eighty degrees. In the example embodiment shown in FIGS. 4 and 6, the spread angle α is about seventy degrees.

As briefly introduced earlier, the light-emitting unit 32 of the example embodiment of FIGS. 2 through 6 is provided with an attachment mechanism 31 configured to engage a hard hat 10 in a manner that facilitates attachment and removal of the light-emitting unit 32 without compromising the integrity of the exterior surface 22 thereof. More particularly, the attachment mechanism 31 includes an adjustable band 80 that is configured to selectively constrict around the hard hat 10. For this purpose, the adjustable band 80 may include an adjustment mechanism 82 for selectively constricting the band 80 around a portion of the hard hat 10, such as, for example, the worm gear adjustment mechanism shown in FIG. 5. The adjustment mechanism 82 may be located in a distinct compartment or sub-housing 84 of the light-emitting unit 32. The compartment or sub-housing 84 may have opposing portions 84*a*, 84*b* that substantially enclose the adjustment mechanism 82 therebetween. A portion 86 of the adjustment mechanism 82, such as, for example, a hex key socket or screw head, may be accessible from an exterior of the light-emitting unit 32 via an access aperture 87 in the compartment or sub-housing 84. In this manner, a user may readily access and adjust a tension of the band 80 to securely constrict the ban 80 around the hard hat 10. A portion of the compartment or sub-housing 84 of the light-emitting unit 32 may be shaped to engage or abut a portion of the hard hat 10 upon installation. In this manner, the compartment or sub-housing 84 of the light-emitting unit 32 may act as a spacer to radially space the annular housing 40 apart from the exterior surface 22 of the hard hat 10. Providing a space or gap between the annular housing 40 and the hard hat 10 may enable the light-emitting unit 32 to accept a wide variety of hard hats 10 and other headgear.

In some embodiments, such as the example embodiment shown in FIGS. 2 through 6, the attachment mechanism 31 may further include a plurality of engagement devices 88 spaced around an inner periphery of the annular housing 40. Each of the plurality of engagement devices 88 may be repositionable along a portion of the inner periphery of the annular housing 40. For example, with reference to FIG. 6, the housing 40 may define a track or groove 90 extending along portions of the inner periphery of the housing 40 and the engagement devices 88 may include a coupling feature 92 for slidably engaging the track or groove 90. In this way, the engagement devices 88 may be adjusted along the inner periphery of the housing 40 to locations which align with projections 20 or other features of the hard hat 10 to which the light-emitting unit 30 is to be attached, as shown best in FIG. 3. When properly positioned, the engagement devices 88 can be urged into engagement with the projections 20 of the hard hat 10 as the band 80 is constricted. For example, the engagement devices 88 may be forced to flex inwardly into engagement with the projections 20 of the hard hat 10 by the band 80 as it is constricted. The engagement devices 88 may include an engagement surface that is generally complementary to structures or features of the hard hat 10 to which the light-emitting unit 32 is to be attached. The engagement devices 88 may also include one or more projections 94 for nesting with the hard hat 10 or portions thereof. In this manner, the light-emitting unit 32 can be quickly and securely attached to a hard hat 10 for use. In addition, the light-emitting unit 32 can be quickly detached for storage or for use with another hard hat 10.

Although the example embodiment of FIGS. 2 through 6 is shown as including an attachment mechanism 31 having an adjustable band 80, it is appreciated that a variety of different attachment mechanisms may be used to secure the light-emitting unit 32 to a target hard hat 10.

Figure 7:
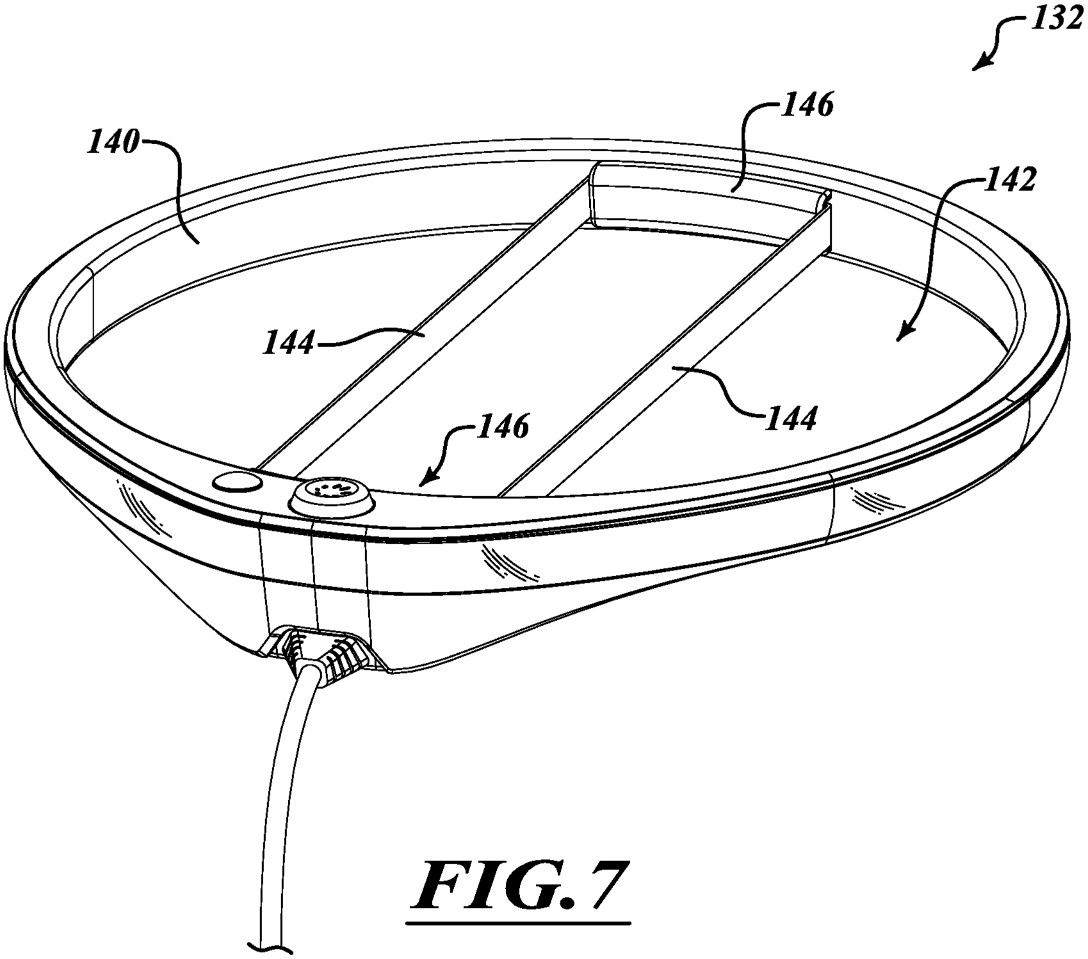
FIG. 7 is a perspective view of a light-emitting system, according to another embodiment, that is readily attachable to headgear, such as, for example, the conventional hard hat shown in FIG. 1.

For example, FIG. 7 shows a light-emitting unit 132 having an annular housing 140 that is attachable to headgear, such as a hard hat, via an attachment mechanism comprising one or more flexible bands 144. The one or more flexible bands 144 are attached to the housing 140 to span across a receiving aperture 142 thereof when the light-emitting unit 132 is detached from the headgear. The one or more bands 144 may be secured to anchor locations 146 on opposing ends of the housing 140. The band or bands 144 may be stretched or elongated to receive a portion of the headgear and to thereafter apply a bias or inwardly directed pressure to the headgear to retain the light-emitting unit 132 in position. In some embodiments, the one or more bands 144 and associated anchoring structures may be provided as a separate, removable and replaceable unit that attaches to the inner periphery of the annular housing 140 and provides for efficient replacement of the attachment mechanism in the event the one or more bands 144 fail or are excessively worn.

Figure 8:
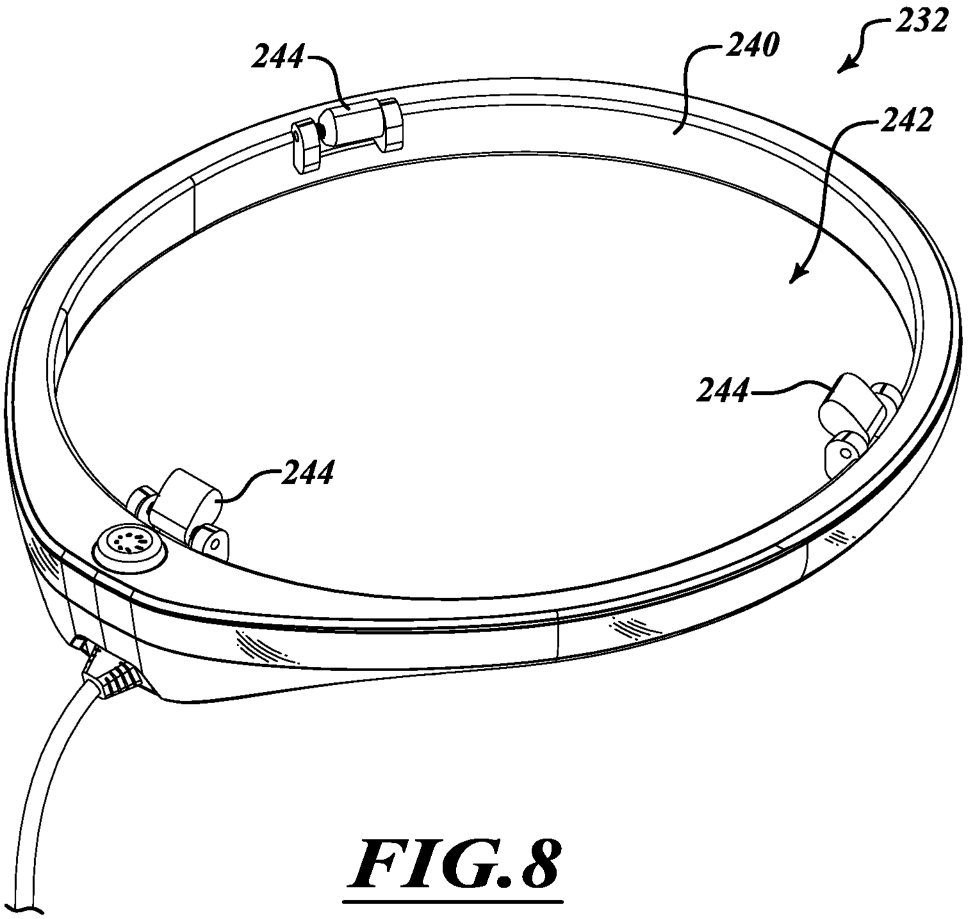
FIG. 8 is a perspective view of a light-emitting system, according to another embodiment, that is readily attachable to headgear, such as, for example, the conventional hard hat shown in FIG. 1.

As another example, FIG. 8 shows a light-emitting unit 232 having an annular housing 240 that is attachable to headgear, such as a hard hat, via an attachment mechanism comprising a plurality of cam devices 244. Each cam device 244 may be positioned to contact a respective portion of the headgear and rotate into secure engagement therewith as the light-emitting unit 232 is removably attached to the headgear for use. The cam devices 244 may be positioned about an inner periphery of the annular housing 240 at regular or irregular intervals. The cam devices 244 may extend radially inwardly toward a receiving cavity 242 defined by the housing 240. The cam devices 244 may collectively space the housing 240 away from the exterior surface of the headgear to which it is attached during use such that a gap or space is maintained therebetween.

Figure 9:
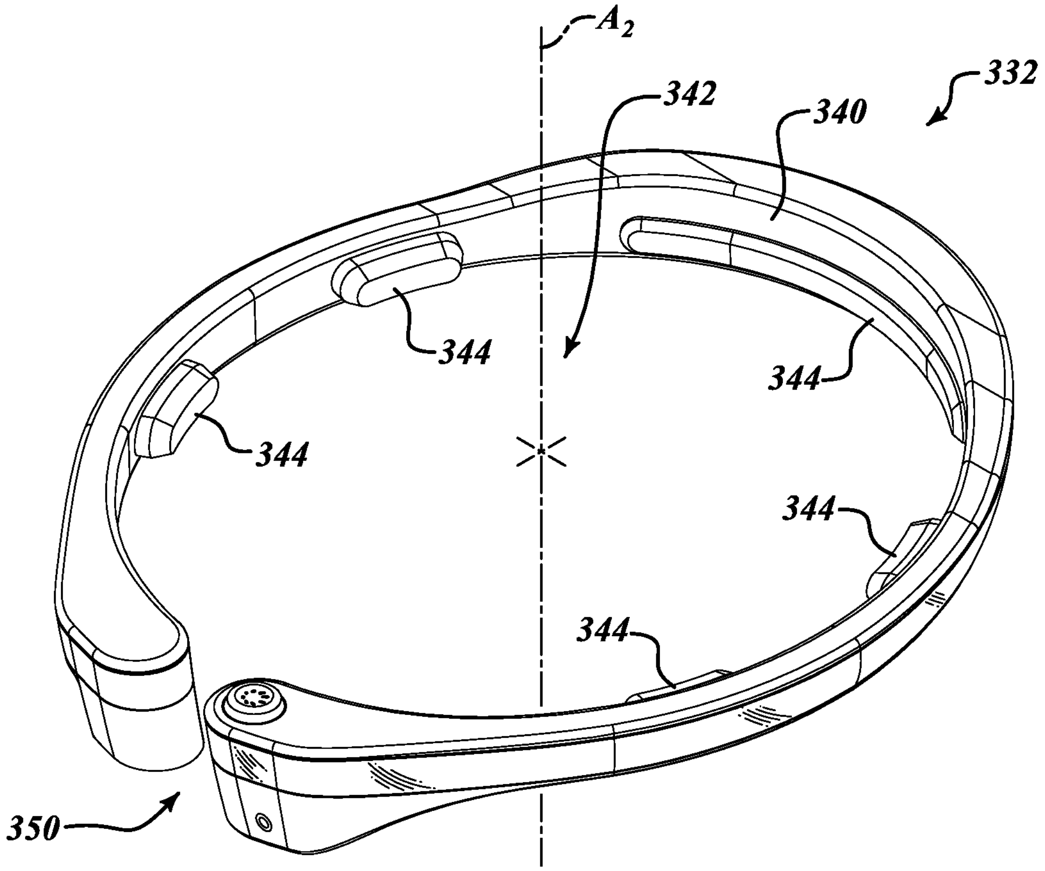
FIG. 9 is a perspective view of a light-emitting system, according to yet another embodiment, that is readily attachable to headgear, such as, for example, the conventional hard hat shown in FIG. 1.

As yet another example, FIG. 9 shows a light-emitting unit 332 having a generally annular housing 340 that is attachable to headgear, such as a hard hat, via an attachment mechanism comprising a plurality of spacers 344 each having a predetermined width to span a respective space between the housing 340 and the headgear when the light-emitting unit 332 is removably attached to the headgear for use. The spacers 344 may be integrally formed in the housing 340 and may include a semi-rigid material that is configured to compress slightly as the light-emitting unit 332 is secured to the headgear. In some instances, for example, the spacers 344 may be sized to provide a snug or press-fit with headgear having a select configuration. The spacers 344 may be spaced about an inner periphery of the annular housing 340 at regular or irregular intervals. The spacers 344 may extend radially inwardly toward a receiving cavity 342 defined by the housing 340. Spacers 344 of different widths may be removably attachable to predetermined locations within the inner periphery of the housing 340 to accommodate headgear having different configurations.

Irrespective of the particular form of the attachment mechanism that may be employed with various embodiments of the light-emitting systems described herein, the attachment mechanism (when provided) may be configured to secure the annular housing 40, 140, 240, 340 to headgear without compromising the integrity of or penetrating an exterior surface of such headgear. In addition, in at least some embodiments, the annular housing 40, 140, 240, 340 may be configured such that the annular housing 40, 140, 240, 340 is radially offset from the headgear when the light-emitting unit 32, 132, 232, 332 is removably attached to the headgear for use. The annular housing 40, 140, 240, 340 may be radially offset from the headgear by a space or gap having a generally uniform or a variable width. Providing a space or gap between the annular housing 40, 140, 240, 340 and the headgear may enable the light-emitting unit 32, 132, 232, 332 to accept a wide variety of hard hats 10 and other headgear. In other embodiments, the annular housing 40, 140, 240, 340 may be sized to abut or otherwise interface with a receiving surface or surfaces of the headgear.

In some embodiments, such as, for example, the embodiment shown in FIG. 9, the light-emitting unit 332 may include a generally annular housing 340 that has a broken or open profile defining a gap 350. In this manner, the light-emitting unit 332 may be configured to generate only a partial halo of light around a vertical axis $A_2$ defined by the housing 340. In some embodiments, the light-emitting unit 332 may include a plurality of lighting elements (not visible) and at least one lens 346 coupled to the housing 340 which are configured to selectively generate light that radiates outwardly away from the housing and sweeps through an azimuth angle between 180 degrees and 360 degrees. Preferably, however, the plurality of lighting elements (not visible) and the at least one lens 346 are configured to selectively generate light that sweeps through an azimuth angle of at least 270 degrees to provide enhanced illumination in areas beyond the user's direct field of view.

Figure 10:
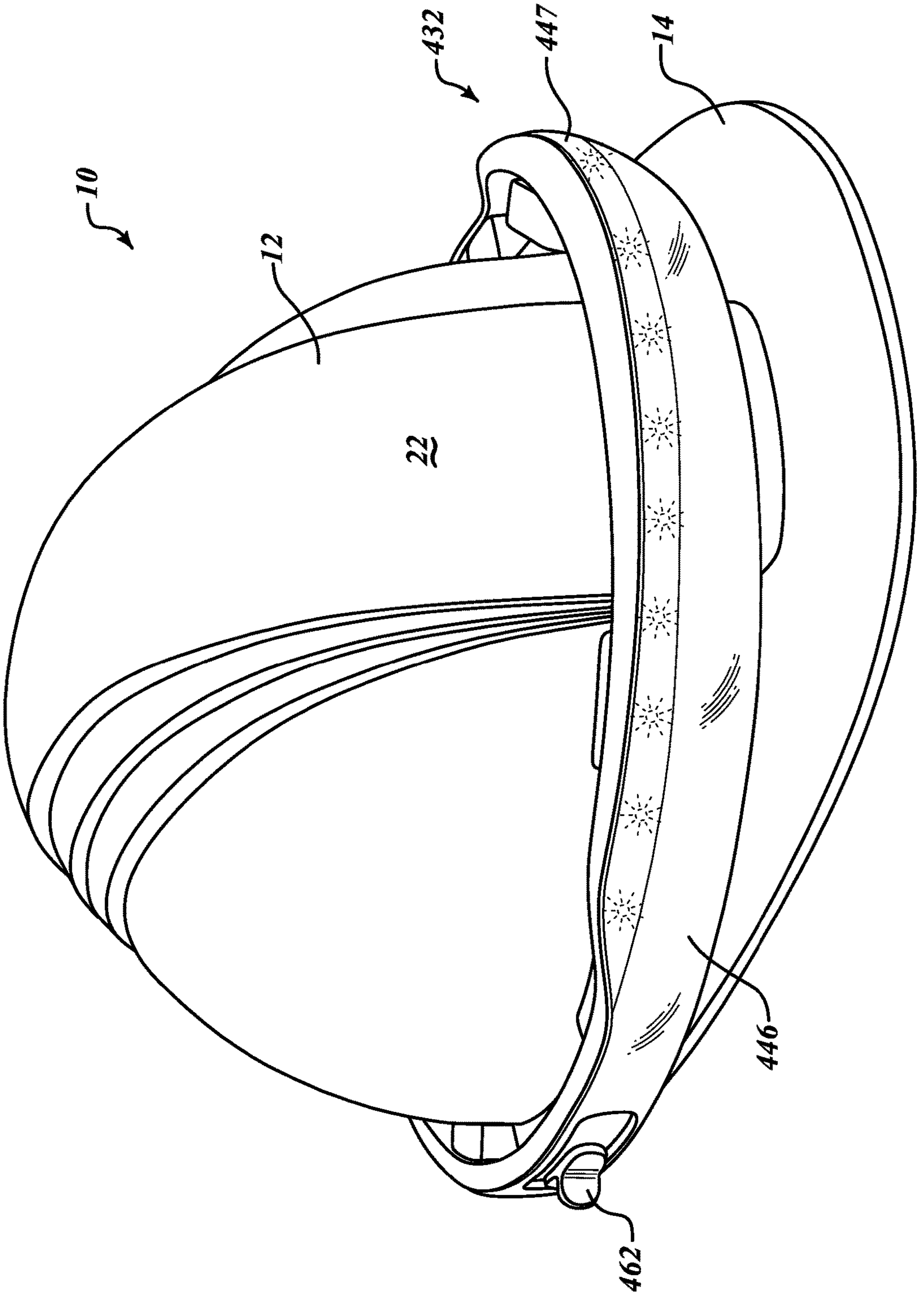
FIG. 10 is a perspective view of a light-emitting system, according to still yet another embodiment, that is readily attachable to headgear, such as, for example, the conventional hard hat shown in FIG. 1.

Some embodiments of the light-emitting units described herein may be configured to generate only a single ring or halo of light H, while others may include an auxiliary set of lighting elements to supplement the same. For example, FIG. 10 shows an example embodiment of a light-emitting unit 432 having a primary set of lighting elements beneath an annular lens element 446 to produce a ring or halo of light emanating therefrom and an auxiliary set of lighting elements beneath a secondary lens 447 to illuminate independent of the primary set of lighting elements. The auxiliary set of lighting elements may be positioned in a forehead or brow region of the light-emitting unit 432 to provide supplemental light within the user's immediate field of view. In this manner, a user may selectively activate the auxiliary set of lighting elements when additional light may be needed or desired to complete a particular task. In addition, the auxiliary set of lighting elements may be positioned at a relatively higher position to emit light more effectively over the brim 14 of the hard hat 10 to which the light-emitting unit 432 may be attached. A control element 462 (e.g., a switch, button, dial, lever) may be provided to selectively activate the primary set of lighting elements and/or the auxiliary set of lighting elements to illuminate. Although a single control element 462 is shown, it is appreciated that one or more additional control elements 462 may be provided to operate the distinct lighting arrangements simultaneously or independently.

Moreover, it is appreciated that a subset of the plurality of lighting elements of the various described embodiments may be configured to selectively illuminate at a different frequency or with a different intensity relative to the other lighting elements. In this regard, a predetermined pattern of fluctuating intensity and/or frequency may be used to signal different events or conditions, such as, for example, an emergency. In addition, various regions may be illuminated to display different colors of light. For example, a rear portion of the light-emitting unit may be configured to display a red hue or tint to readily identify the backside of a user. Still further, individual lighting elements may be provided to illuminate with different frequencies and intensities and to be controlled independently such that the combined light source of a grouping of the lighting elements can be controlled to produce light from a wide variety of selectable colors. In this manner, a user may selectively control the color of light that may emanate from the light-emitting system.

Moreover, aspects and features of the various embodiments described above can be combined to provide further embodiments. In addition, U.S. patent application Ser. No. 17/687,514, filed Mar. 4, 2022, U.S. patent application Ser. No. 16/993,107, filed Aug. 13, 2020, now U.S. Pat. No. 11,291,260, U.S. patent application Ser. No. 16/893,269, filed Jun. 4, 2020, now U.S. Pat. No. 10,779,598, U.S. patent application Ser. No. 16/731,828, filed Dec. 31, 2019, now U.S. Pat. No. 10,709,189, U.S. patent application Ser. No. 16/254,319, filed Jan. 22, 2019, now U.S. Pat. No. 10,561,188, U.S. patent application Ser. No. 15/970,588, filed May 3, 2018, U.S. patent application Ser. No. 15/653,353, filed Jul. 18, 2017, now U.S. Pat. No. 9,986,778, U.S. patent application Ser. No. 14/794,615, filed Jul. 8, 2015, now U.S. Pat. No. 9,737,105, U.S. patent application Ser. No. 13/972,627, filed Aug. 21, 2013, now U.S. Pat. No. 9,103,539, U.S. patent application Ser. No. 13/779,634, filed Feb. 27, 2013, now U.S. Pat. No. 8,529,082, and Provisional Application No. 61/604,982, filed Feb. 29, 2012, are incorporated herein by reference for all purposes and aspects of the invention can be modified, if necessary, to employ features, systems, and concepts disclosed in these applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A light emitting unit, comprising:

an annular form factor comprising a rigid housing sized to circumferentially surround a user's head when the light emitting unit is worn;

a flexible band structure that is configured to be stretched or elongated to apply a bias or inwardly directed pressure to retain the light emitting unit in position during use, wherein the flexible band spans across a receiving aperture formed by the rigid housing, and wherein the receiving aperture formed by the rigid housing is sized to receive a portion of a hardhat or other headgear worn by the user; and a plurality of lighting elements arranged to generate at least a partial halo of light including in a forward region in front of the user's head and in a rearward region behind the user's head when the light emitting unit is worn and the plurality of lighting elements are illuminated.

2. The light emitting unit of claim 1 wherein the flexible band structure is distinct from and coupled to the rigid housing.

3. The light emitting unit of claim 1 wherein the lighting unit is configured to generate a complete halo of light around the user's head.

4. The light emitting unit of claim 1 wherein the flexible band is located radially inward of the rigid housing.

5. The light emitting unit of claim 1 wherein the flexible band includes an adjustment mechanism for constricting the band.

6. The light emitting unit of claim 5 wherein constricting the band includes adjusting a tension in the band.

7. The light emitting unit of claim 1 wherein the flexible band is secured to anchor locations on opposing ends of the rigid housing.

8. The light emitting unit of claim 1, wherein the flexible band attaches to an inner periphery of the rigid housing and is removable from the rigid housing.

9. The light emitting unit of claim 1 wherein the rigid housing has a broken or open profile.

10. A light emitting unit, comprising:

an annular form factor comprising a rigid housing sized to circumferentially surround a user's head when the light emitting unit is worn;

a flexible band structure that is configured to be stretched or elongated to apply a bias or inwardly directed pressure to retain the light emitting unit in position during use; and a plurality of lighting elements arranged to generate at least a partial halo of light including in a forward region in front of the user's head and in a rearward region behind the user's head when the light emitting unit is worn and the plurality of lighting elements are illuminated, and wherein, when the light emitting unit is received on a portion of a hardhat or other headgear, the rigid housing is radially offset from the portion of the hardhat or other headgear by a gap.

* * * * *